United States Patent [19]
Harris

[11] 3,718,309
[45] Feb. 27, 1973

[54] PIPE COATING MOLD

[75] Inventor: Robert J. Harris, Marrero, La.

[73] Assignee: H. C. Price Co., Bartlesville, Okla.

[22] Filed: Nov. 5, 1970

[21] Appl. No.: 87,227

[52] U.S. Cl. .........................249/90, 29/239, 29/257, 249/66, 249/95, 249/96, 264/262, 425/116
[51] Int. Cl. ..............................................B22d 19/00
[58] Field of Search ..... 18/36; 264/261, 262; 25/1 A, 25/127 R, 127 C; 249/48, 49, 66, 83, 90, 95, 96; 29/239, 240, 256, 257; 425/116, 121, 256

[56] References Cited

UNITED STATES PATENTS

| | | | |
|---|---|---|---|
| 2,716,623 | 8/1955 | Tator | 249/95 X |
| 1,233,878 | 7/1917 | Horning | 249/66 |
| 2,831,231 | 4/1958 | Toensing | 25/127 X |
| 2,482,239 | 9/1949 | Botwinick | 18/36 |
| 2,554,453 | 5/1951 | Bryan | 18/36 |
| 3,355,137 | 11/1967 | Tsuzuki | 249/18 |
| 2,180,695 | 11/1939 | Rembert | 264/262 |

Primary Examiner—Robert L. Spicer, Jr.
Attorney—J. David Wharton

[57] ABSTRACT

A breakaway mold for forming a sealing joint between two sections of coated pipe is configured to permit easy removal of the mold after the coating material has hardened. Two identical mold halves present the mold, and each half includes a central arcuate section and a pair of opposed, integral planar end sections which facilitate removal of the mold by assuring a shearing action between the mold and the molding material. Each mold half is also provided with outwardly extending flanges which mate with the flanges of the other mold half to provide a sealing surface at each side of the mold. Breakaway bolts on the mold flanges provide readily accessible means for moving the mold halves away from the molding material.

A special tool is provided to assure removal of one mold half after the other mold half has been previously broken away from the molding material. The tool includes an arcuate brace which is positioned in overlying relationship to the pipe and structure for engaging the previously removed mold half after the latter has been repositioned around the pipe. The second mold half can then be removed by applying a force against the first-removed mold half.

14 Claims, 9 Drawing Figures

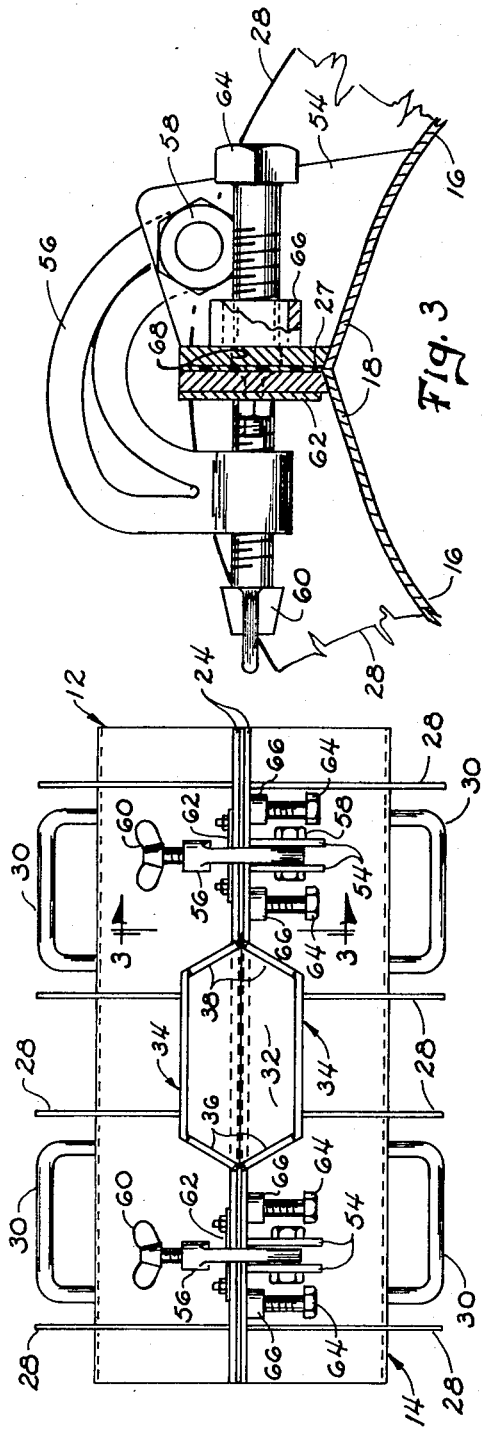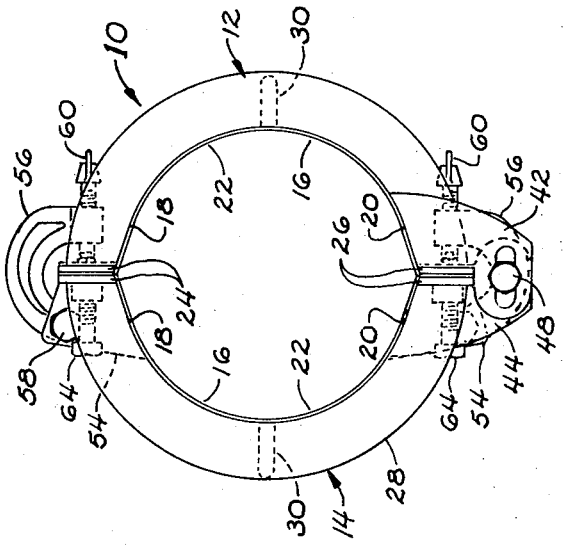

PATENTED FEB 27 1973 3,718,309

INVENTOR.
Robert J. Harris
BY Don M. Bradley
ATTORNEY

PIPE COATING MOLD

This invention relates to a breakaway mold which is particularly adapted for use in coating pipe.

In the laying of pipe for the transmission of gas and petroleum products, it has long been the practice to provide a protective coating for the pipe so that it may withstand the deteriorating effects of being placed underground or underwater. In order to be able to assemble the pipe sections in the field, it is necessary to leave the ends of the pipe sections exposed to permit field welding. The protective coating material is then molded around the welded joint to provide a continuous protective coating. In some instances pressure molds have been utilized for the field molding operation, and while the results obtained are satisfactory, such molds are high in cost, require an expensive mobile tractor to assure their mobility, and can be operated only by relatively skilled labor. In an effort to reduce some of the above-mentioned cost factors associated with pressure molds, some interest has been shown in disposable paper molds. While paper molds do offer a substantial savings over conventional pressure molds, they can not be removed after the molding material has hardened because of the bond formed between the paper and the molding material. This prohibits the use of pipe testing equipment which, in certain instances, is required before the pipe can be buried in the ground.

It is, therefore, an object of the present invention to provide a mold for coating pipe which offers substantial savings in cost over a pressure mold and yet can be removed from the pipe after the molding material has hardened to permit the use of pipe testing equipment.

Another object of the invention is a pipe coating mold which can be operated by relatively unskilled labor thereby further reducing the cost of the molding operation.

An important aim of this invention is to provide a breakaway mold which is configured to present a pair of planar surfaces which are tangential to the surface being coated to thereby facilitate removal of the mold when the molding material has hardened.

Another object of the invention is to provide a breakaway mold which is comprised of two mold halves and the mold halves are pivotally coupled together in such a way so as to permit the mold halves to be backed away from the hardened coating material to facilitate shearing of the material from the surface of the mold.

It is also one of the objects of the invention to provide a breakaway mold as described in the foregoing objects which is lightweight and provided with structure to facilitate cooling of the mold after hot molding material has been poured therein.

Another important aim of the invention is a relatively lightweight inexpensive pipe coating mold which can be reused any number of times.

Another one of the objects of the invention is to provide a breakaway mold comprised of two mold halves wherein one or more breakaway bolts are provided on the mold halves to facilitate removal of the same after the molding material has hardened.

Still another object of the invention is to provide a breakaway mold comprised of two mold halves wherein each of the halves is constructed to present complemental sealing surfaces at opposite sides of the mold, thereby assuring a fluid-tight seal.

It is also an object of the present invention to provide a tool for facilitating removal of one half of a breakaway mold after the other half has been removed, which shears the remaining mold half from the hardened molding material without damage to the latter.

It is also an object of this invention to provide a tool as described in the above object which utilizes the previously removed mold half as a "dead-man" whereby a force can be applied against the dead-man to remove the remaining mold half.

In the drawings:

FIG. 1 is a side elevational view of a breakaway mold constructed according to the present invention;

FIG. 2 is a top plan view of the mold shown in FIG. 1;

FIG. 3 is an enlarged cross-sectional view of the means for holding the two mold halves in tight interengagement;

FIG. 4 is an end elevational view of the mold;

Figure 7:
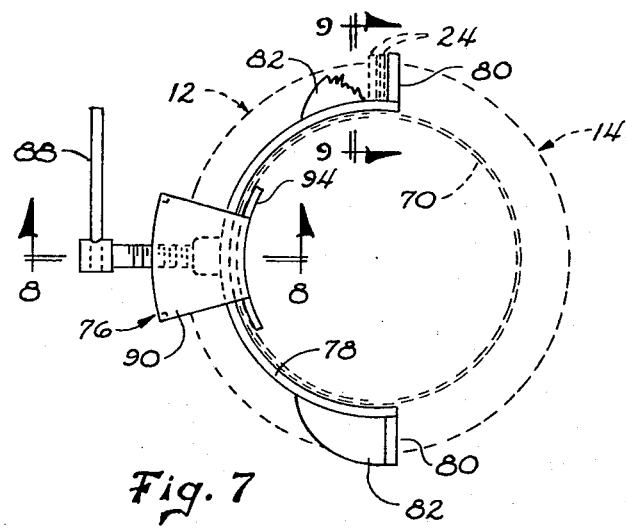
FIG. 7 is a side elevational view of the mold removal tool of the invention with the tool being shown disposed around a pipe section to facilitate removal of one of two mold halves, the mold halves and the pipe being shown in phantom for purposes of illustration.

Referring initially to FIG. 4 wherein the breakaway mold is designated generally by the numeral 10, it is seen that the mold 10 comprises two mold halves in the form of first and second complemental mold members 12 and 14 which are pivotally coupled and disposed in tight interengagement as will be more fully explained hereinafter. The mold members 12 and 14 are essentially identical and each includes a longitudinally extending central arcuate section 16 and a pair of integral, opposed planar end sections 18 and 20 which cooperate with the section 16 to present a continuous molding surface 22. At the terminal edges of the sections 18 and 20 of each of the members 12 and 14, a pair of outturned flanges 24 and 26 project radially away from the surface 22. The flanges 24 and 26 provide sealing surfaces at opposite sides of the mold 10 when the mold members 12 and 14 are disposed in interengagement. In certain instances it may be desirable to include a sealing strip 27 (FIG. 3 and FIG. 5) to assure a fluid-tight seal between the surface of the complementally interengaged flanges 24 and 26. The sealing strip 27 is preferably formed from a resinous material such as Teflon which does not tend to adhere to the sealing surface during the molding operation.

Each of the members 12 and 14 is also provided with a plurality of arcuate ribs 28 (FIG. 2) which extend transversely of the outer surfaces of the sections 16–20 from one of the flanges 24 to the other flange 26. A pair of handles 30 are disposed on the side of each of the members 12 and 14 intermediate a pair of ribs 28. As best illustrated in FIG. 2, each of the members 12 and 14 is cut away at one of its terminal edges to define an opening 32 into the interior of the mold 10 when the members 12 and 14 are disposed in interengagement. Each of the members 12 and 14 is also provided with an outwardly extending wall 34 which is rigid with a respective flange 24 and includes a pair of end lengths 36 and 38 which diverge as they approach the terminal edge of the member. As is clear when FIGS. 1 and 2 are viewed together, the walls 34 of the members 12 and 14 cooperate to present a funnel or pour spout into the opening 32.

The two mold members 12 and 14 are pivotally coupled adjacent the flanges 26 at one side of the mold by a plurality of couplings designated generally by the numeral 40.

Figure 5:
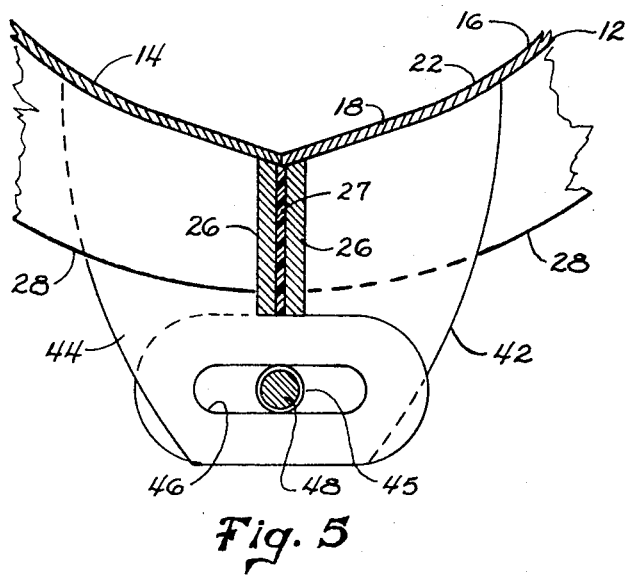
FIG. 5 is a greatly enlarged partial cross-sectional view taken along line 5—5 of FIG. 1 and illustrating the structure for pivotally joining the two mold halves.

One of the couplings 40 is illustrated in detail in FIG. 5 and includes a pair of brackets 42 and 44 which are rigid with and extend outwardly from the members 12 and 14 respectively. The brackets 42 and 44 project across the flanges 26 in side-by-side relationship when the latter are disposed in interengagement. The bracket 42 has an aperture 45 therein and the bracket 44 has an elongated transversely extending slot 46, the aperture 45 being in alignment with the slot 46 as illustrated in FIG. 5. A coupling component in the form of a bolt 48 provided with a pair of washers 50 and a lock ring 52 (FIG. 1) extends through the aperture 45 and the slot 46 to complete the coupling of the members 12 and 14.

The member 12 is also provided with a plurality of outwardly extending ears 54 which are disposed in pairs adjacent the flanges 24 and 26 to provide mounting brackets for a plurality of C-clamps 56. Each of the C-clamps 56 is pivotally mounted on a corresponding pair of ears 54 by a bolt and nut assembly 58. Each of the C-clamps 56 has a wing nut 60 for bringing the two members 12 and 14 into tight complemental interengagement as best illustrated in FIG. 3. The member 14 is provided with a pair of stainless steel wearing strips 62 which are bolted to the flange 24 in the area where the wing nuts 60 contact the flange.

A plurality of back-off bolts 64 are disposed along the flanges 24 and 26 of the member 12, the bolts 64 being threadably received by a plurality of complementally threaded collars 66 which are rigid with and project outwardly from the flanges 24 and 26. A plurality of openings, one of which is visible in FIG. 3 and designated by the numeral 68, are provided in the flanges 24 and 26 to allow the bolts 64 to pass through the flanges of the member 12 and into engagement with the corresponding flanges of the member 14.

When the mold 10 is utilized for forming a protective coating around a cylindrical body such as a pipe 70 (FIG. 6) having a length greater than the length of the mold, a pair of flexible strands 72 and 74 which are preferably manila rope are disposed in circumscribing relationship to the pipe 70, with the ends of the strands being secured to assure that the strands remain taut on the pipe. Thus, the strands 72 and 74 form end seals to preclude the flow of molding material from the mold when the latter is disposed around the pipe.

As is well known to those skilled in the pipe coating industry, it is then common practice to coat pipes with a bituminous mastic material and then cover the hardened coating with a layer of whitewash to protect the coating from deterioration. In utilizing the mold 10, it has been found to be desirable to remove the whitewash from the protective pipe coating and then apply an appropriate primer after two pipe sections are welded together. The mold 10 is preferably sand blasted and then coated with a resinous material which will resist adhesion to the yet-to-be-applied coating material, a preferred resinous mold coating being the product sold under the name Eylan Formula 1010 by the Whitford Corporation of Westchester, Pennsylvania. This material can be sprayed onto the sand-blasted surface at a thickness of 2½ to 3 mils. The Eylan coating is then cured for 10 to 15 minutes at 400° F. In some instances it may be desirable to substitute a sheet of Teflon for the Eylan coating in which case the Teflon can be secured to the surfaces 22 of the mold members 12 and 14 by an appropriate adhesive. In still other cases, it may be desirable to omit either the Eylan coating or the Teflon sheets.

Figure 6:
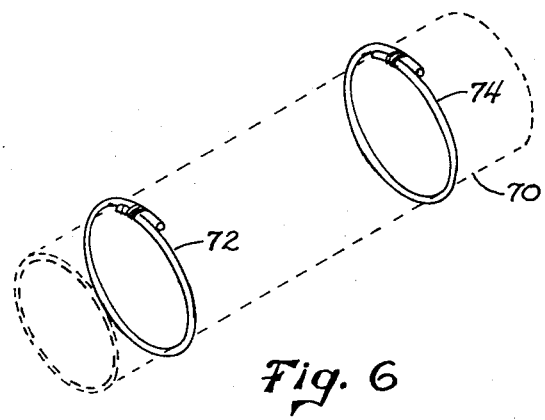
FIG. 6 is a schematic representation of the sealing strands which are placed around a section of pipe before the mold is moved into place.

Before the mold 10 is placed around the pipe 70, however, it is desirable to spray the interior of the mold with a suitable release agent such as that sold by the Crown Manufacturing Co., under the name Die-Cast Mold Release No. 3110. After the strands 72 and 74 have been disposed around the pipe 70 as illustrated in FIG. 6, the mold 10 may be disposed around the pipe by uncoupling the members 12 and 14 at one side of the mold and then sliding the mold beneath the pipe section 70. It is, of course, necessary to assure that the dependent surfaces presented by the flanges 24 and 26 are in tight interengagement and that the inner molding surfaces 22 of the members 12 and 14 are in tight interengagement with the strands 72 and 74. Thus, the C-clamps 56 will swing into bridging relationship to the flanges 24 and 26 and the wing nuts 60 are tightened sufficiently to preclude the flow of molding material from the mold 10. It is preferable to dispose the strands 72 and 74 to provide an overlap of 3–4 inches between the coating already on the pipe and that to be formed by the mold 10. The molding material is introduced into the mold 10 in a molten state at a temperature of 375° – 400° F., with the temperature being dependant upon the molding material utilized, although in most instances this will be a bituminous mastic material as previously mentioned. The molding material is introduced into the mold 10 through the opening 32 to within approximately 1 inch of the top of the walls 34. Most molding materials of the type referred to above harden in a relatively short period of time and the ribs 28 function as cooling fins to reduce the time interval before the mold 10 can be removed. To further enchance cooling of the molding material and reduce the time interval before the mold 10 can be removed, it may be desirable to spray the exterior of the mold with cooling water.

After the molding material has hardened sufficiently, the C-clamps 56 are loosened and the back-off bolts 64 tightened to force the members 12 and 14 away from the hardened coating material. It should be emphasized that the configuration of the molding surfaces 22 with the planar sections 18 and 20 at opposite ends of the arcuate section 16 greatly facilitate removal of the members 12 and 14. This is thought to be attributable to the fact that the sides of the mold 10 immediately adjacent the flanges 24 and 26, which sides provide the greater resistance to any force tending to separate the members 12 and 14, are tangentially disposed relative to the molded surface rather than following a continuous circular pattern. Thus, the sides of the mold 10 are sheared from the hardened molding material rather than being pulled along the surface of the material as the mold members 12 and 14 are backed away from the coated pipe. This shearing action of the members 12 and 14 relative to the hardened molding material is further facilitated by the diverging lengths 36 and 38 of the walls 34. Since a quantity of the molding material inevitably remains between the two walls 34, the lengths 36 and 38 present surfaces which extend in the general direction of the line of force being applied through the back-off bolts 64 and these surfaces offer the greatest resistance to movement of the members 12 and 14 away from each other. The disposition of the lengths 36 and 38 in diverging relationship to the terminal edges of the members 12 and 14 substantially reduce this resistance, however, and facilitate the shearing of the mold members 12 and 14 away from the hardened molding material. As a result of the location of the breakaway bolts 64 adjacent both the flanges 24 and the flanges 26, the members 12 and 14 can be forced apart at opposite sides of the mold.

The provision of the transversely extending slot 46 in the brackets 42 further facilitates removal of the members 12 and 14 from the hardened molding material by allowing the members 12 and 14 to move in the direction of the forces being applied through the breakaway bolts 64 without any of the forces being translated into a torque about the pivot bolt 48. Thus, a certain amount of play is present in each of the pivotal couplings 40 which has the additional advantage of preventing any binding between the hardened molding material and the members 12 and 14.

Figure 8:
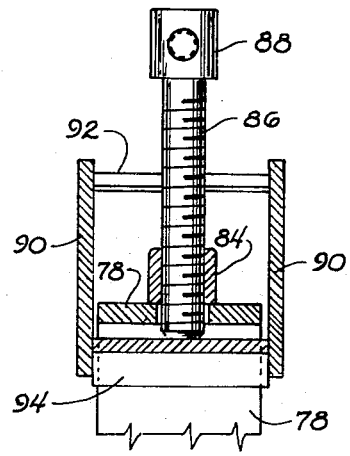
FIG. 8 is an enlarged cross-sectional view taken along line 8—8 of FIG. 7.
Figure 9:
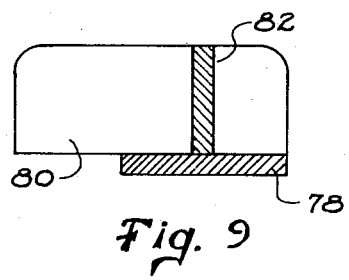
FIG. 9 is a cross-sectional view taken along line 9—9 of FIG. 7.

Upon tightening of the bolts 64, one of the members 12 and 14 will be sheared from the hardened molding material. In some instances, however, the other member may remain adhered to the molding material. For this reason a tool is provided for facilitating removal of the second mold member after the first member has previously been broken away by the bolts 64. The tool is illustrated in FIGS. 7–9 and designated generally by the numeral 76. The tool 76 comprises an arcuate brace member 78 which is provided with a pair of outturned feet 80, one of which is shown in FIG. 9, at opposite ends, which feet are rigid with the member 78 and partially supported by gussets 82. An upstanding threaded protrusion 84 which is centrally disposed relative to the member 78 receives a bolt 86 which is provided with handle structure 88. The bolt 86 also supports a frame comprised of opposed polygonal panels 90 and an apertured connecting plate 92 which is rigid with the panels 90 and receives the bolt 86. Rigid with the panels 90 beneath the member 78 is a saddle clamp 94.

When the member 12 is to be broken away from the hardened molding material after the member 14 has previously been broken away, the member 14 is first repositioned around the coated pipe 70 as illustrated in FIG. 7. It is desirable to place a tool 76 adjacent either end of the mold 10 with the brace member 78 in overlying relationship to the pipe 70 and the feet 80 inserted behind the flanges 24 and 26 of the member 14. The handle 88 of each tool is turned to tighten the clamp 94 and thereby hold the brace member 78 rigid with the mold member 14. The mold member 12 can now be removed by applying a force against the mold member 14. This is readily accomplished by again tightening the bolts 64. When the member 12 breaks away from the pipe 70, the tools 76 are removed and the two mold members 12 and 14 placed at another location along the pipe 70.

From the foregoing description it is apparent that the mold 10 of the invention is completely reuseable while offering many of the savings previously associated only with throw-away molds. Relatively unskilled labor can use the mold 10 because of its simplicity in design and removal of the mold is greatly facilitated by the novel configuration of the molding surface 22. The tool 76 assures that complete removal of both halves of the mold 10 is always possible.

Having thus described the invention, what is claimed as new and desired to be secured by Letters Patent is:

1. A breakaway mold comprising:
first and second complemental mold members each having first and second terminal edges adapted to abut corresponding edges on the other member,
each of said members further including first and second terminal sections each section presenting a generally planar molding surface adjacent each of said terminal edges, and an intermediate section presenting a central arcuate molding surface intermediate the planar molding surfaces,
at least one of said members having an opening for the introduction of molding material into the interior of the mold; and
back-off means for releaseably maintaining said mold members in tight complemental interengagement.

2. A breakaway mold comprising:
first and second complemental mold members,
each of said members including a central arcuate section and opposed planar end sections,
at least one of said members having an opening for the introduction of molding material into the interior of the mold,
each of said members being provided with an outturned flange at each of its terminal edges to provide sealing surfaces at opposite sides of the mold when the members are disposed in interengagement;
means for releaseably maintaining said mold members in tight complemental interengagement; and
a back-off bolt at each end of the mold on one of the flanges of one of said members,
said bolts being movable against the adjacent flange of the other member whereby to force said members apart.

3. The invention of claim 2, wherein said end sections merge into said arcuate section to present a continuous molding surface.

4. The invention of claim 2, wherein said means comprises a C-clamp disposed in bridging relationship to each pair of interengaged flanges.

5. The invention of claim 4, wherein said C-clamps are pivotally mounted on said mold members.

6. The invention of claim 2, wherein said members are pivotally coupled adjacent said flanges at one side of said mold.

7. The invention of claim 6, wherein is included a bracket rigid with each of said members and projecting across said flanges in side-by-side relationship at said one side of the mold when the flanges are in interengagement, each of said brackets having an elongated slot therein extending transversely of said flanges; and a pivot pin extending through the slots of the brackets for coupling said members.

8. The invention of claim 1, wherein each of said members is cut away at one of its terminal edges to define an opening into said mold when said members are disposed in interengagement, each of said members including an outwardly extending wall for presenting a funnel into said opening, and each of the walls including a pair of end lengths which diverge as they approach the terminal edge of the member.

9. The invention of claim 1, wherein each of said members is provided with a plurality of ribs projecting from its outer surface and extending transversely of the member.

10. The invention of claim 1, wherein said mold is adapted to be placed around a cylindrical body having a length greater than the length of the mold, and wherein is included means for sealing the ends of the molds relative to the surface of the body.

11. The invention of claim 10, wherein said sealing means comprises a pair of flexible strands disposed in circumscribing relationship to said body.

12. The invention of claim 2, and a second pair of back-off bolts on one of the flanges of one of said members at the side of the mold opposite the first-mentioned back-off bolts, said second pair of back-off bolts being movable against the adjacent flange of the other member whereby said members are forced apart at opposite sides of the mold.

13. A pipe coating mold comprising:
first and second complemental mold members adapted to be disposed in interengagement surrounding a length of pipe,
each of said members including a central arcuate section and opposed planar end sections which cooperate with said arcuate section to present a continuous molding surface,
each of said members being provided with an outturned flange at each of its terminal edges and being cut away at one of said edges to define an opening into said mold when said members are disposed in interengagement;
an outwardly extending wall on each of said members for presenting a funnel into said opening, each of said walls including a pair of end lengths which diverge as they approach the terminal edge of the member;
a bracket rigid with each of said members and projecting across said flanges in side-by-side relationship at one side of the mold when the members are in interengagement, each of said brackets having an elongated slot therein extending transversely of said flanges;
a pivot pin extending through the slots of the brackets for coupling said members; and
means for releaseably maintaining said mold members in tight complemental interengagement.

14. A breakaway pipe coating mold and tool therefor comprising:
first and second complemental mold members adapted to be disposed in interengagement surrounding a length of pipe,
each of said members including a central arcuate section and opposed planar end sections which cooperate to present a continuous molding surface,
at least one of said members having an opening for the introduction of molding material into the interior of the mold;
means for releaseably maintaining said mold members in tight complemental interengagement;
an arcuate brace member adapted to overlie said pipe at one end of one of said mold members,
said brace member being provided with structure for engagement with said other mold member after the latter has first been broken away from said molding material and then repositioned around said pipe; and
means for holding said brace member rigid with said other mold member, whereby said one mold member can be moved away from said pipe by applying a force against said other mold member.

* * * * *